July 5, 1960     R. L. McILVAINE ET AL     2,943,801
MULTIPLE STAGE MIXING APPARATUS
Filed Dec. 23, 1957     3 Sheets-Sheet 1
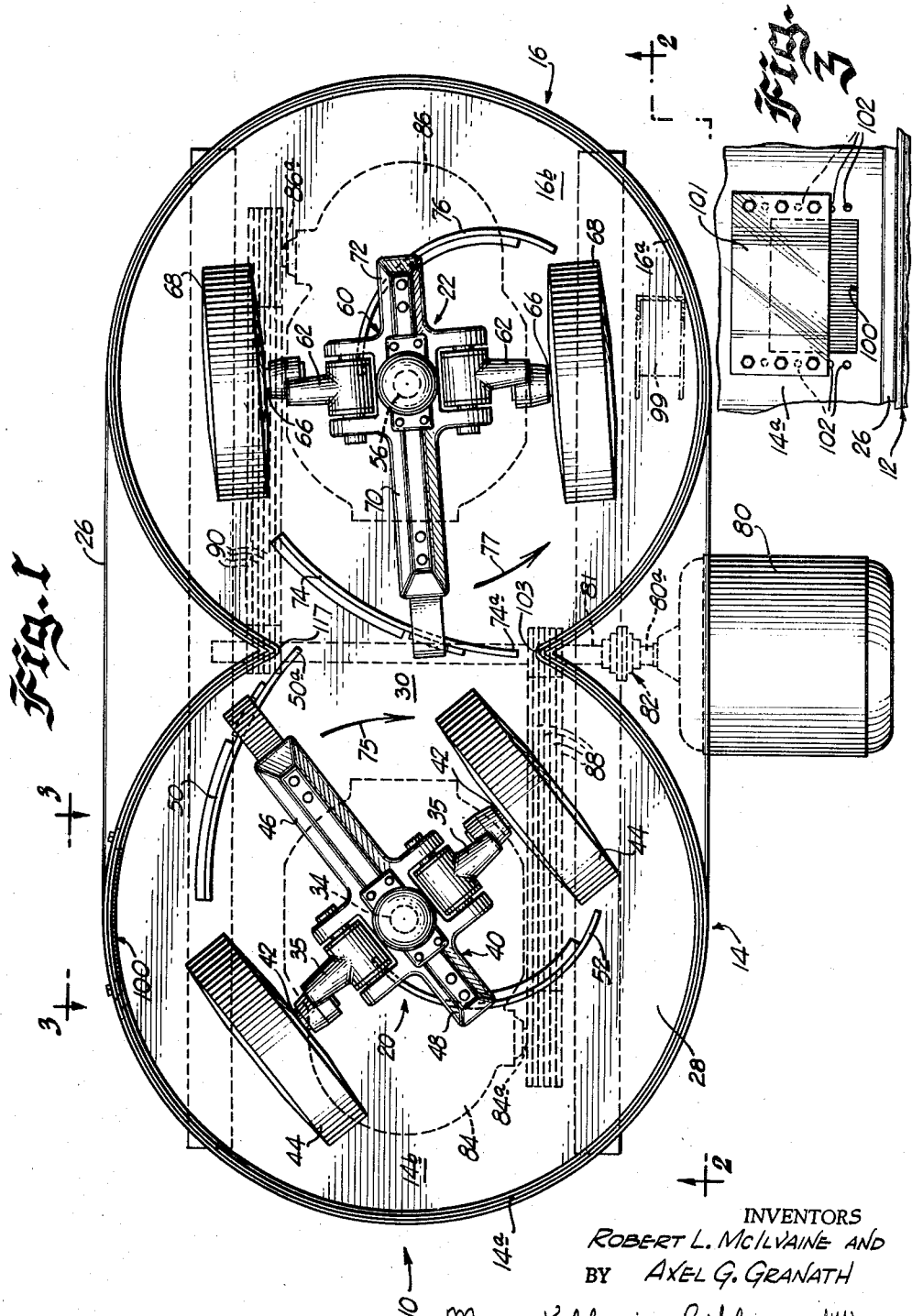
INVENTORS
ROBERT L. McILVAINE AND
BY AXEL G. GRANATH
ATTORNEYS.

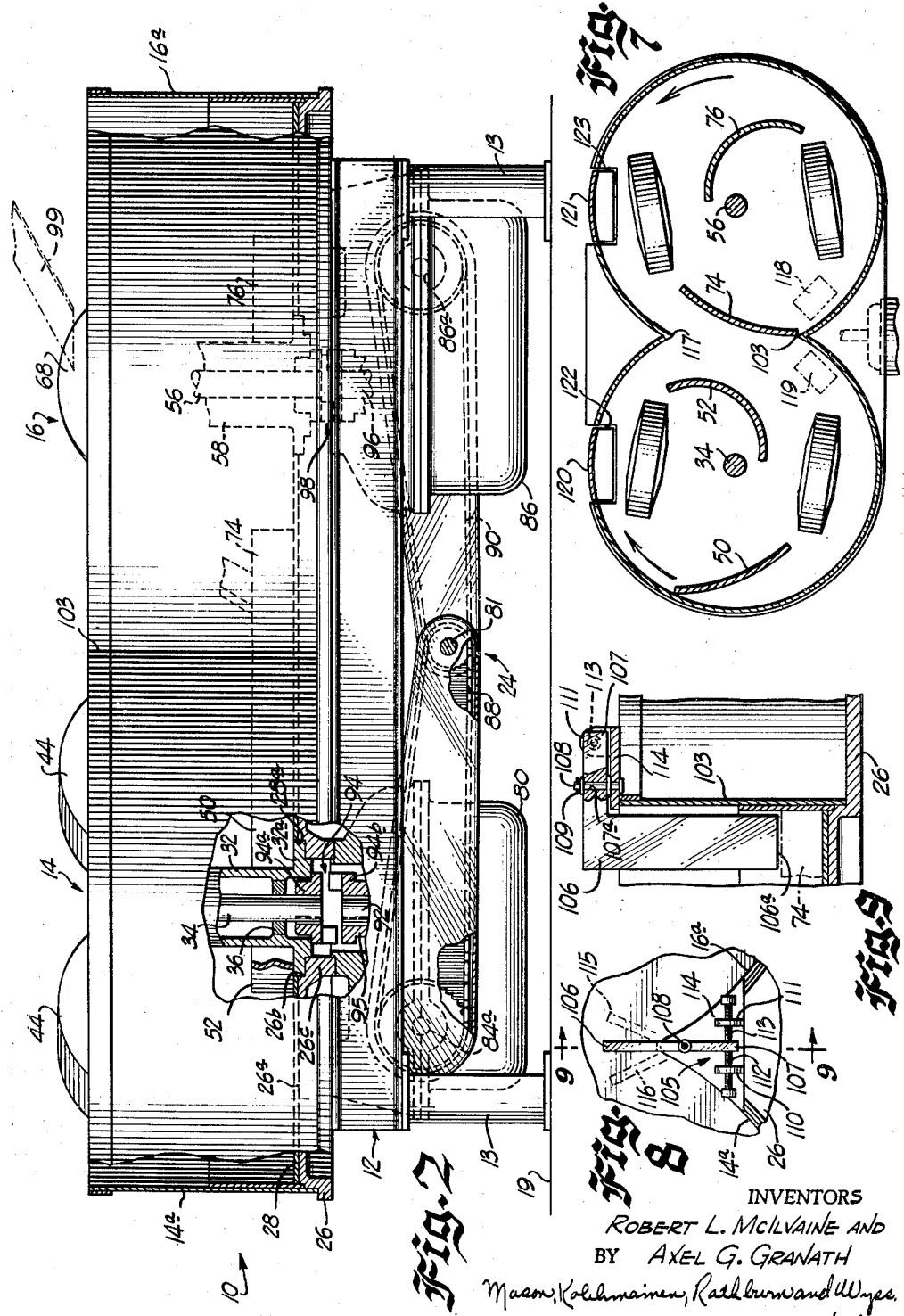

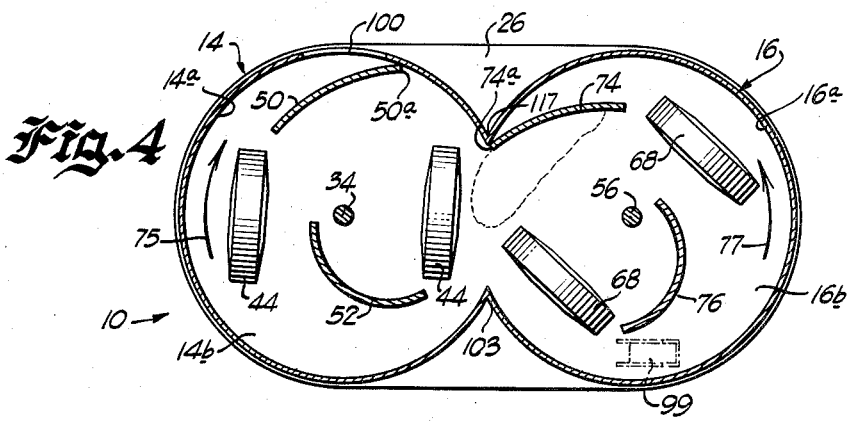
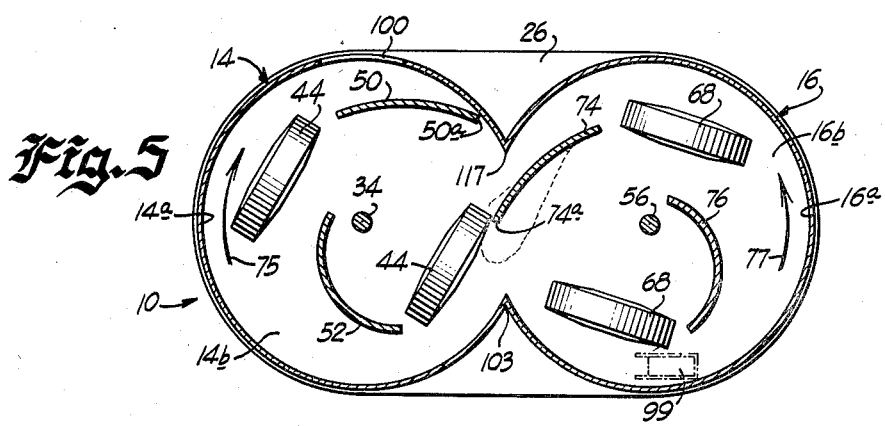
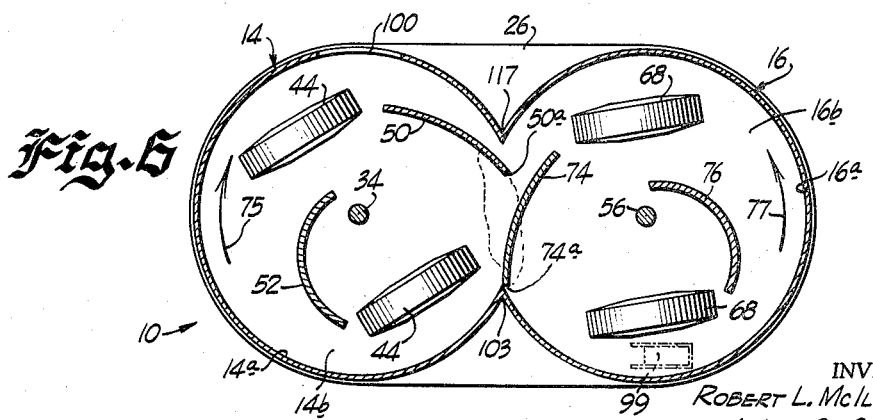

United States Patent Office

2,943,801
Patented July 5, 1960

2,943,801

MULTIPLE STAGE MIXING APPARATUS

Robert L. McIlvaine, Winnetka, and Axel G. Granath, Chicago, Ill., assignors to Herbert Simpson Corporation, Chicago, Ill., a corporation of Illinois Filed Dec. 23, 1957, Ser. No. 704,707

7 Claims. (Cl. 241—124)

The present invention relates to a mixer and, more particularly, to a new and improved mulling machine employing a plurality of interrelated mixing stages for granular material commonly used in a foundry.

The present invention relates to improvements in mixers of the type shown in United States Patent No. 2,727,696 of Walter Horth which patent is assigned to the same assignee as the present invention. Mixers of this general character have been used extensively and successfully because they are highly efficient and yet are very simple in construction but, prior to the present invention, such mixers have been limited to batch operation and are capable of handling only about a 5,000 pound batch. In a batch operation, a quantity of material is introduced to the mixer, is mixed for a predetermined period, and is then completely evacuated. In many operations it is desirable to mix much larger batches without increasing the time required for the mixing while in other operations it is desirable to provide a continuous flow mixing action wherein material to be mixed is introduced to the mixer and mixed material is continuously withdrawn at approximately the same rate as the incoming material. The primary object of the present invention is, therefore, to provide a mixer which permits both batch operation in large quantities and continuous flow mixing while retaining all of the advantages of the mixer shown in the above identified Horth patent with respect to efficiency and simplicity.

A more specific object of the present invention is to provide a new and improved mulling machine.

It is another object of the present invention to provide a mulling machine in which separate adjoining cribs have an overlapping portion through which plow means mounted in each crib operate to transfer granular material between the cribs.

Another object of the invention, in accordance with the preceding objects, is to control the amount of material passed from one crib to the other during the mixing operation.

It is yet another object of the present invention to provide a mulling machine employing a pair of plow means respectively located in separate adjoining cribs, which plow means are driven through a common portion in predetermined sequence.

Still another object of the present invention is to provide a mulling machine wherein the transfer of material between adjoining cribs is positively controlled.

A further object of the present invention is to provide a mulling machine which employs first and second plow and mulling assemblies respectively located within adjoining cribs, the relative position of the assemblies being adjustable to establish either a continuous flow or a batch operation.

Another object of the present invention is to provide a new and improved mulling machine of the character indicated above wherein continuous flow mixing is provided by continuously passing granular material from a first crib to a second adjoining crib for discharge from the machine while only a small portion of the processed granular material is recycled back into the first crib for mixture with unprocessed granular material entering the first crib.

Another object of the present invention is to provide a mulling machine of the character indicated above wherein the batch operation is effected by transferring granular material from the first crib to the second crib at a rate substantially equal to the rate of flow of material from the second crib to the first crib, with the result that a substantial portion of the granular material is moved from one crib to the other crib during each cycle of operation.

The above and other objects are realized, in accordance with the present invention, by providing a mixer including adjoining cribs within which separate plow and mulling assemblies are rotatably mounted. The cribs employ a common wearplate having a common portion traversed by both of the plows during a portion of their revolutions. The plow and mulling assemblies in the two cribs are driven from a common source so that they are synchronized in order to maintain a predetermined relative position between the plows as they pass through the common portion. An adjustable deflector is preferably located between the two cribs for controlling the amount of material flowing between the cribs. By changing the relative position of the respective plows, the mulling machine is rendered effective for use in either a continuous flow or a batch operation. In the continuous flow operation, granular material is continuously admitted to the first crib and mixed material is discharged from the second crib at a rate substantially equal to the rate of flow of the new material entering the first crib. To effect a continuous transfer of material between the cribs, the plow in the second crib passes through the common portion immediately after the plow from the first crib so that a relatively large quantity of material passes from the first crib to the second crib while a somewhat smaller amount of mixed granular material is returned or recycled from the second crib back into the first crib. In the batch operation, a predetermined batch of granular material is admitted to the cribs and after a preselected period of time the mixed material is discharged simultaneously from both cribs. The plows in the two cribs are so arranged that as each plow passes through the common portion it transfers a relatively large quantity of granular material from one crib to the other. The amounts of material transferred by the plow of each crib are substantially equal and, accordingly, during each complete cycle or revolution of the plows, there is considerable interchange between the materials in the cribs to effect a more thorough mixing.

The invention, both as to its organization and manner of operation together with further objects and advantages thereof, will best be understood by reference to the following description taken in connection with the accompanying drawings, in which:

Fig. 1 is a top plan view of a mulling machine embodying the features of the present invention, shown as used in a continuous flow mixing operation, although to prevent confusion, the adjustable deflector plate has been omitted from this view;

Fig. 2 is a sectional view taken substantially along line 2—2 of Fig. 1 with certain parts broken away to facilitate the illustration;

Fig. 3 is a fragmentary, side elevation view looking in the direction of the arrow pointed lines 3—3 in Fig. 1 and showing particularly the adjustable discharge door;

Figs. 4, 5 and 6 are top plan diagrammatic views illustrating various positions of the plows and mullers during the continuous flow operation;

Fig. 7 is a top plan diagrammatic view of the mulling machine of the present invention shown as used in a batch operation;

Fig. 8 is a fragmentary, top plan view showing an adjustable deflector plate which may be employed in the apparatus shown in Fig. 1; and Fig. 9 is a fragmentary, sectional view taken along a line substantially corresponding to line 9—9 in Fig. 8.

Referring now to the drawings, the mixing apparatus of the present invention is shown in Figs. 1 through 6 for effecting a continuous flow mixing operation and is shown in Fig. 7 for batch operation. Considering first the operation of the apparatus illustrated in Figs. 1 through 6, a mixer 10 is there shown comprising a supporting structure 12 (Figs. 1 and 2) including a plurality of legs 13 for supporting a pair of cribs 14 and 16 above a floor surface 19 or the like. The cribs are formed by substantially cylindrical walls 14a and 16a which are joined together at their intersections as by welding. The crib 14 is, therefore, located immediately adjacent the crib 16 and communicates with the latter crib through vertical openings 18 defined at the intersection of the walls 14a and 16a. Muller and plow assemblies 20 and 22 are respectively supported for rotation within the cribs 14 and 16 and are synchronously driven by a drive mechanism 24 carried by the supporting structure 12 beneath the cribs. The assemblies 20 and 22 when rotated function to mix granular material positioned with the cribs 14 and 16 in the manner described in detail in the above identified Horth patent.

As is shown in Fig. 2, the lower ends of the walls 14a and 16a are secured by suitable fasteners (not shown) to a common bedplate 26 which is seated on and suitably attached to the supporting structure 12. The bedplate 26 has a flat upper surface 26a for supporting a wearplate 28 common to both of the cribs 14 and 16. The wearplate 28 serves as the floor for both of the cribs 14 and 16 and, as shown in Fig. 1, may be considered as comprising a first floor portion 14b located within the crib 14 and a second floor portion 16b positioned within the crib 16.

Turning now to a consideration of the muller and plow assemblies 20 and 22, it will be observed that these two assemblies are identical and, accordingly, in the interest of avoiding needless repetition, only the assembly 20 will be described. The assembly 20 is similar to the mechanism shown in the Horth patent referred to above and includes a hollow stationary support 32 extending upwardly and centrally within the crib 14. The support 32 has a laterally extending annular base 32a seated within an opening 26b in the floor portion 14b of the wearplate and within a recess 28a defined in an annular flange 26c in the bedplate 26. The base 32a is fixedly secured to the bedplate 26 by bolts (not shown). A vertically extending shaft 34 is disposed within the support 31 and is rotatably supported by spaced apart bearings 36 located adjacent the upper and lower ends of the support 32. The upper end of the shaft 34 carries a cross head 40 which supports a pair of pivotal rocker arms 35 (Fig. 1), the rocker arms 35 being disposed in generally horizontal positions by a tensioning mechanism (not shown). At the extreme outer end of each of the rocker arms 35 there is rotatably mounted a shaft 42 carrying a muller wheel 44. Each of the muller wheels 44 is spaced slightly from the upper surface of the wearplate 28 so that as the muller wheel is rotated it crushes and breaks up granular material located on the wearplate 28 within the crib 14. The cross head 40 further includes a long arm 46 and a short arm 48 for respectively carrying an outside plow 50 and an inside plow 52. The outside plow 50 includes a plow blade of generally arcuate configuration having a leading or outer edge 50a located immediately adjacent the walls 14a of the crib 14 and also having an inner or trailing edge located between the support 32 and the wall 14a of the crib. The inner plow 52 also includes a plow blade of generally arcuate configuration having an inner edge located adjacent to the support 32 and an outer edge located at a point just ahead of one of the muller wheels 44 so that the plow 52 functions to direct material to the latter wheel. Since the cross head 40 is attached to the upper end of the shaft 34, rotation of the latter shaft by the drive mechanism 24 causes the plows 50 and 52 and the mullers 44 to be moved in unison around the crib 14.

The assembly 22 is identical with the assembly 20 and likewise includes a shaft 56 located centrally of a support 58 which extends upwardly within the crib 16 and is connected to the bedplate 26 in the manner described above. The assembly 22 further includes a cross head 60 secured to the upper end of the shaft 56 and pivotally supporting a pair of cross arms 62. The outer ends of the arms 62 respectively carry shafts 66 for rotatably supporting muller wheels 68 which are identical in construction to the muller wheels 44. The cross head 60 further includes a relatively long arm 70 and a short arm 72 for respectively carrying an outside plow 74 and an inside plow 76. The plows 74 and 76 are constructed as the mirror image of the plows 50 and 52. Expressed in another way, the plows 74 may be considered as being right handed and the plows 50 and 52 may be considered as left handed. Moreover, the plows 74 and 76 and the muller wheels 68 are oriented within the crib 16 in a manner similar to the orientation of the plows 50 and 52 and the muller wheels 44 in the crib 14 so that the extreme outer edge 74a of the blade of the outside plow 74 is spaced slightly from the wall 16a and the trailing edge 74b of the plow is located intermediate the crib wall 16a and the support 58. As is indicated by the arrow pointed line 75 in Fig. 1, the drive mechanism 24 is effective to rotate the assembly 20 in a clockwise direction and to rotate the assembly 22 in a counterclockwise direction as indicated by arrow pointed line 77.

It will be appreciated that since the outside plows 50 and 74 have their leading edges 50a and 74a slightly spaced from the walls 14a and 16a, respectively, each of these edges during a portion of each revolution of their respective assemblies extends through the openings 18. Thus, the plow 50 sweeps over a portion of the floor 16b of the crib 16 and the plow 74 sweeps a portion of the floor 14b with the result that these two plows pass over a common portion or zone of the wearplate 28, which common zone is identified by reference numeral 30 in Fig. 1.

In order to avoid engagement of the plows 50 and 74 during their revolutions, it is necessary that the assemblies 20 and 22 be driven in synchronism by the drive mechanism 24 and that the plows be so oriented that they pass through the common zone 30 in sequence. To this end, as is shown in Fig. 1, the drive mechanism 24 includes a motor 80 supported from the floor surface 19 adjacent to the cribs 14 and 16. The motor 80 includes a motor shaft 80a drivingly connected through a coupling 82 to a shaft extension 81 journalled on the support structure 12. The coupling 82 may be disassembled to permit replacement of the motor 80 without disturbing the shaft 81 and its associated drive components. The shaft extension 81 is connected through sprocket and chain assemblies 88 and 90 to drive input shafts 84a and 86a, respectively, of reduction gearings 84 and 86. The reduction gearing 84 includes an output shaft 92 (Fig. 2) which is vertically aligned with the rotatable shaft 34 and is adapted to be connected thereto through a claw clutch 94. The clutch 94 includes a first set of teeth of jaws 94a fixedly attached to the lower end of the shaft 34 and engageable with a second set of teeth or jaws 94b formed on a sleeve 95 splined to and slidable upon the upper end of the shaft 92. The sleeve 95 is movable axially of the shaft 92 by any suitable mechanism which may be manually controlled in order to permit engagement or disengagement of the clutch 94. The reduction gearing 86 likewise includes an output shaft 96 vertically aligned with the rotatable shaft 56. The shaft 96 is adapted to be connected to the shaft 56 through a claw clutch 98 which is, in all respects, identical to the clutch 94.

as described above. It will be understood that disengagement of the clutch 94 permits rotation of the assembly 20 independently of the drive mechanism 24 while disengagement of clutch 98 permits independent rotation of the assembly 22. To change the relative positions of the assemblies 20 and 22 in order to alter the positions of the plows 50 and 74 relative to one another, it is merely necessary, with the motor 80 inoperative, to disengage one of the clutches while maintaining the other clutch engaged and thereafter to rotate the disengaged assembly 20 or 22 until the desired position is reached. For example, the position of assembly 20 may be adjusted by releasing clutch 94 and turning the assembly 20 independently of the motor 80 and the assembly 22. During this adjustment, assembly 22 is held against rotation due to the fact that shafts 56 and 96 are clutched to the stationary motor shaft 80a. Of course, the position of assembly 22 may be altered in similar manner by disengaging clutch 98 while clutch 94 remains engaged.

The reduction gearings 84 and 86 are identical in construction but due to the action of the sprocket and chain assemblies 88 and 90, the assembly 22 rotates in a clockwise direction as viewed in Fig. 1 while the assembly 22 rotates in a counterclockwise direction, as shown by the arrow pointed line 77. Thus, the outside plow 50 rotates in a clockwise direction and its leading edge 50a passes over the common zone 30 from the top to the bottom as viewed in Fig. 1, while the outside plow 74 rotates in a counterclockwise direction and also passes over the common zone 30 from top to bottom. By properly orienting the assemblies 20 and 22 in the manner described above, the plows 50 and 74 can be positioned to pass over the common zone 30 without engaging or colliding with one another so that they can be used to transfer the granular material between the cribs. The drive mechanism 24 is effective to rotate the assemblies 20 and 22 at relatively high speed so that the material within the cribs is thrown around considerably by centrifugal action of the rotating plows. Thus, the material is not only moved inwardly and outwardly within the cribs but is also thrown upwardly from the crib floor by the high speed plows. In one installation of the present invention, excellent mixing action was obtained by rotating the plows at 22 revolutions per minute.

Any type of granular material may be mulled in the cribs, a specific example being foundry sand which is caked or compacted as a result of use in a foundry mold during a molding operation. In the continuous flow operation illustrated in Figs. 1 to 6, the granular material is fed into the crib 16 from conventional conveying or feeding equipment and is discharged from the crib 14 in well mixed finely divided form. Specifically, granular material is continuously fed as, for example, by conveyor apparatus to a conduit having an outlet located immediately above the crib 16, the outlet being illustrated in dotted lines and being identified by reference numeral 99. The mixed material is discharged from the crib 14 through an opening 100 formed in the wall 14a as is shown in Figs. 1 and 3.

The rate of discharge of material from the crib 14 may be adjusted by means of a plate or door 101 detachably mounted on the exterior of the wall 14a as is best shown in Fig. 3. The door is provided with a series of spaced apertures along each of its side edges while the wall 14a is provided with groups of tapped openings 102 located along each side of the opening 100 and adapted to be aligned with the apertures in the door 101 so that attaching screws may be passed therethrough for holding the door in position. Obviously, different ones of the openings 102 and the apertures in the door may be aligned in order to adjust the position of the door and, hence, to alter the amount of the opening 100 that is covered by the door. In this manner the size of the uncovered portion of the opening 100 may be controlled in order to regulate the rate of flow of material from the crib 14.

The material emerging from the conduit 99 falls to the floor 16a of the crib 16 and is then directed beneath the muller wheels 68 by the plows 74 and 76 in order to break up the material and mix it. Assuming that equal quantities of material are being charged into and discharged from the respective cribs, the partially mixed granular material within the crib 16 tends to build up adjacent to the forward edge 74a of the plow 74 and a portion of this material is carried around the crib in front of the plow 74 due to the restraining force supplied by the wall 16a of the crib 16. However, when the leading edge 74a of the plow 74 enters the common zone 30, as indicated in Fig. 4, the restraining action of the wall 16a is removed and a portion of the granular material carried by the plow 74 is thrown by centrifugal force upwardly and into the crib 14 through the openings 18. Transfer of the granular material from the crib 16 to the crib 14 is continued during the passage of the plow 74 through the entire common portion 30 (see Fig. 5), and is stopped when the leading edge 74a of the plow 74 moves beyond the common zone 30 as indicated in Fig. 6. The plow 74 cooperates with the juncture 103 between the walls 14a and 16a to shear off any agglomerated granular material that may be accumulated immediately forward of or adjacent to the outside edge 74a of the plow 74.

To control the amount of granular material transferred between the cribs there is provided an adjustable deflector mechanism 105 which functions to deflect the material thrown upwardly and outwardly by the rotating plows. The mechanism 105 in the form shown in Figs. 8 and 9 includes a generally vertical plate or paddle 106 mounted for pivotal movement upon a base 114 welded or otherwise secured to the cribs at a point adjacent junction 103 between the walls 14a and 16a. The plate 106 is adapted to be pivoted by manually operable adjusting mechanism accessible from the exterior of the apparatus 10. Obviously, the pivotal mounting for the plate 106 and the adjusting mechanism may take a number of forms, but as illustrated in Figs. 8 and 9 the plate 106 is provided with a laterally extending arm 107 having a vertical bore 107a therein for receiving a vertical pivot pin 108 fixedly secured to the base 114. The arm 107 may be held on the pivot pin by means of a cotter pin 109 and suitable washers may be employed as shown to facilitate the pivotal movement. The manual adjusting mechanism comprises a pair of ears 110 and 111 welded or otherwise secured to the base 114 and extending parallel to each other on opposite sides of the arm 107. Aligned adjusting screws 112 and 113 are passed through tapped bores in the bars 110 and 111, respectively, so that their free ends engage the opposed sides of the arm 107 at a point near its outer end. Adjustment of the screws 112 and 113 pivots the arm 107 and the plate 106 about the pin 108 and these screws also cooperate to lock the plate in position following the adjustment. The lower end 106a of the plate 106 is disposed just above the path of movement of the plow blades of the assemblies 20 and 22 so that the plate 106 can deflect material thrown upwardly by the plows but does not interfere with the plow rotation. The plate 106 extends upwardly along the junction edge 103 and is of such width that regardless of the position to which it is adjusted it does not interfere with the movement of the muller wheels in either of the cribs. When the adjusting screws 112 and 113 are effective to hold the plate 106 in its full clockwise position as viewed in Fig. 9 and as indicated by broken lines 115, a maximum amount of the material thrown upwardly by the plow 74 is directed into the crib 14 while a minimum amount of the material thrown upwardly by the plow 50 is allowed to pass into the crib 16. In similar manner, when the plate 106 is in its full counterclockwise position as indicated by broken lines 116, a minimum amount of material passes from plow 74 to crib 14 while a maximum amount of material is returned to the crib 16 from the plow 50. The plate 106 can, of course, be adjusted to occupy any position intermediate the two described extremities in order to control the flow of material between the cribs. A similar adjustable deflector mechanism could be located adjacent the edge junction 117 between the walls 14a and 16a, if desired, although this is not shown in the drawings since such a deflector would have much less effect on the material flow than the deflector mechanism 105 described above.

The material transferred into the rib 14 from the crib 16 is moved through the crib 14 under the control of the outside and inside plows 50 and 52. In a manner similar to the action of the plow 74, the granular material is carried in front of the outside plow 50 until the latter plow passes through the common zone 30 whereupon the granular material is thrown by centrifugal force from the crib 14 back into the crib 16 in a manner similar to the previously described transfer of material from crib 16 to crib 14. However, with the assemblies 20 and 22 oriented relative to one another in the positions shown in Figs. 4, 5 and 6, a larger quantity of material is transferred from the crib 16 to the crib 14 than is recycled back into the crib 16 from crib 14. Specifically, since the plow 74 moves into the common zone 30 just ahead of the plow 50, a portion of the material carried ahead of the latter plow is prevented from flowing into the crib 16 due to the fact that it is confronted by the rear face of plow 74. As shown in Fig. 6, as the plow 50 enters the common zone 30, the plow 74 is positioned to prevent the outward flow of some of the granular material beyond the outer end 50a of the plow 50. By thus positioning the plows 50 and 74, the quantity of material carried by the plow 50 returned to the crib 16 for mixing with the new material being charged continuously into the crib from conduit 99 is somewhat less than the quantity of material transferred to the crib 14 from plow 74. The relative quantities can be controlled as indicated above, by use of the adjustable deflector mechanism 105.

It should be understood that the granular material within the crib 14 is continuously discharged through the uncovered portion of opening 100 due to the centrifugal force produced by rotation of assembly 20 within the crib 14. The quality of the material discharged is an average of the granular material disposed within the crib 14 and includes a mixture of very well mixed material which has been in the apparatus 10 for a considerable period of time together with a small amount of new material introduced through conduit 99 and passed from crib 16 to crib 14 only once.

The quantity of material mixed in a given time and discharged from the apparatus 10 is controlled, as indicated above, by adjustment of door 101, but in a continuous flow process, once the mixer is filled to its proper level the rate of discharge must remain equal to the rate of input. Thus, if the input rate exceeds the output rate the mixer fills and becomes overloaded and, similarly, if the output rate exceeds the input rate the granular material will soon be evacuated from the apparatus. However, as long as the input and output rates remain equal, the rate of flow of material through the apparatus 10 can be altered to control the quality of the output by simultaneously changing both the discharge rate and the input rate. Thus, if the rate of flow of material through the apparatus 10 is increased, the material is subjected to mixing action for a shorter period of time and the quality of the output is poorer whereas a decrease in rate of flow through the apparatus by simultaneously decreasing both the input and discharge rates results in an output of higher quality. The amount of material transferred or returned from crib 14 to crib 16 may be controlled by adjustment of the relative positions of the assemblies 20 and 22 which produces a change in the relative positions of the plow blades 50 and 74. As described above, this change may be effected by disengaging the clutch 94 and then rotating the assembly 20 while maintaining the assembly 22 stationary. For example, assuming that the assemblies 20 and 22 are in the relative positions indicated in Figs. 4 through 6 and that it is desired to increase the rate of return of material from the crib 14 to the crib 16, the assembly 20 is rotated slightly in a counterclockwise direction in order to move the outside plow 50 away from the plow 74 and, hence, to permit a larger flow of material from the plow 50 when the latter passes through the common zone 30. In similar manner, if the assembly 20 is rotated in a clockwise direction as viewed in Figs. 4, 5 and 6, the plow 50 is moved closer to plow 74 as it passes through the common zone 30 and less material is returned to the crib 16.

It should be further understood that the construction of the plow blades also determines the quantity of material returned from crib 14 to crib 16. Accordingly, if arcuately shaped plows of shorter radius than the plows 50 or 74 are employed and the distance between the leading edges of the plows is not changed, a greater amount of material would be transferred or returned from the crib 14 to crib 16.

Although the foregoing description has been directed to a two crib arrangement, it should be observed that a greater number of cribs could also be employed with each crib communicating with adjacent cribs and with all of the cribs having common wearplate areas. In one such arrangement, the cribs may be aligned in a row and the mulling and plow assemblies in the cribs may be so disposed that the material is introduced into a crib at one end of the row and is advanced from that crib in succession to the other cribs until it is discharged from the crib at the opposite end of the row. In another arrangement, one crib located at the center communicates with each of the outside cribs so that material introduced into the center crib is transferred to the outside cribs and is recycled from the outside cribs back into the center crib. Mixed material is then discharged from the outside cribs. In this arrangement, the rate at which material is admitted to the center crib must, of course, be equal to the total rate of discharge from all of the outside cribs.

The mixing apparatus of the present invention may also be used for a batch operation as is illustrated diagrammatically in Fig. 7. In the latter arrangement, the apparatus is adapted to mix a predetermined amount of granular material simultaneously in both cribs for a predetermined period of time after which both cribs are evacuated. Since this arrangement is almost identical to the structure described above, a detailed description is not included and corresponding parts have been assigned the same reference numerals. More specifically, the essential difference between the apparatus used for continuous flow operation and that used for batch operation is that both of the cribs in the latter are provided with discharge doors 120 and 121 and the assemblies 20 and 22 are oriented differently from the arrangement described above.

In the batch operation, assuming that the cribs 14 and 16 are empty, granular material is simultaneously admitted to both of the cribs until a desired level is reached. To this end, the desired amount of material may be stored in weight hoppers or skip buckets which are capable of supplying predetermined quantities of material to the cribs through conduits 118 and 119 indicated by dotted lines in Fig. 7. After the material has been mixed for a predetermined time, the doors 120 and 121 are simultaneously opened to discharge the material from both of the cribs through openings 122 and 123. The discharge doors 120 and 121 are preferably of the type disclosed and claimed in copending application Serial No. 704,528 filed concurrently with this application and assigned to the same assignee as the present invention. Each of these doors, when in closed position, covers an opening in the bottom of the crib aligned with an opening in the side wall. Each door is pivotally supported upon the crib wall and can be moved to open position either by a power operated means or by a manually operated mechanism in order to permit discharge of material both through the opening in the bottom of the crib by gravity and through the opening in the side wall by centrifugal force. The material discharged from the cribs may either be collected by a suitable storage device or may be directed onto a conveyor. By the use of dual supply conduits and dual discharge openings, the time required for charging and discharging the mixing apparatus is maintained at a minimum and a relatively large batch can be mixed in a very short period of time. It will be appreciated that the assemblies 20 and 22 are operated during the charging time and the discharging time as well as during the actual mixing interval.

The assemblies 20 and 22 in the batch operation are so related that the plows 50 and 74 are at all times spaced apart, whereby each plow is able to transfer a considerable portion of the batch to the other crib. This is desirable since, during the batch operation, it is preferable that the material be moved back and forth between the cribs in order to achieve uniformity in the mixture in both of the batches. In any event, it should be observed that the assemblies 20 and 22 rotate within their respective cribs as described above and granular material builds up ahead of each of the plows 50 and 74 during their rotation. The assemblies 20 and 22 are so related that the outside plows 50 and 74 are at all times spaced apart a maximum distance as is best shown in Fig. 7. More specifically, when the plow 74 is passing through the common zone 30, the plow 50 is moving adjacent to that portion of the wall 14a which is aproximately 180° removed from the common zone 30. In similar manner, when the assemblies 20 and 22 are each rotated through one-half revolution or 180° from the position shown in Fig. 7, the plow 50 passes through the common zone 30 while the plow 74 is located adjacent to the portion of the wall 16a most remote from the common zone. Thus, the plow 74 does not block movement of the granular material built up ahead of the plow 50 with the result that the latter material is freely transferred into crib 16 by centrifugal force when the plow 50 passes through the common zone 30 and, similarly, the material carried ahead of the plow 74 is freely transferred by centrifugal force into crib 14 when the plow 74 passes through the common zone 30. One or more adjustable deflector mechanisms like the mechanism 105 described above may be employed to control the transfer of material between the cribs. However, it will be appreciated that equal amounts of granular material are preferably transferred between the two cribs so that the batches in the cribs remain substantially equal.

The quality of the mixed granular material obtained from the batch operation is determined by the duration of the mixing operation. Hence, if it is desired to produce only slightly processed or mixed material, the granular material is mixed for only a short period of time. On the other hand, if it is desired to have highly processed or mixed material, the mixing period is extended. The duration of the mixing period is, of course, a function of the type of material being mixed.

While particular embodiments of the present invention have been shown and described, it will be understood that many changes and modifications may be made and it is, therefore, intended by the appended claims to cover all such changes and modifications as fall within the true spirit and scope of the invention.

What is claimed as new and is desired to be secured by Letters Patent of the United States is:

1. In a mixer for granular material, the combination of a first crib for granular material and having a floor and a wall, a plow mounted within said first crib for movement along the floor and adjacent to the wall, a second crib for housing granular material and having a floor and a wall, a second plow mounted within said second crib for movement along its floor and adjacent its wall, the walls of said cribs being provided with communicating openings, means joining said walls together adjacent said openings, a portion of the floors of said cribs adjacent said openings being swept by both of said plows, a common drive source for rotating said first plow to move it across said floor portion in order to cause a quantity of the material in the first crib to be transferred into said second crib and for rotating said second plow to move it across said floor portion in order to pick up material on said floor portion and to cause a quantity of material in the second crib to be transferred to the first crib so that at least a portion of the material is transferred back and forth between the cribs, and means selectively operable for permitting the latter plow to be adjusted relative to the other plow, thereby to alter the operating characteristics of the mixer.

2. In a mixer for granulated material the combination of a first crib, a second crib in communication with said first crib, first and second plows respectively located within said first and second cribs for movement therein, and means for rotating said plows, said first plow passing through a portion of said second crib to cause material carried by the plow in the first crib to be transferred into the second crib, said second plow positioned relative to said first plow to pass through a portion of said first crib immediately after the passage of said first plow so that a portion of the material adjacent to the second plow is prevented from flowing into the second crib by the first plow, at least a portion of the material is transferred back and forth between the cribs with a smaller quantity transferred from the second crib to the first than is transferred from the first crib to the second crib.

3. A mixer for granular material comprising first and second cribs each having a side wall, said cribs being in communication through openings in their side walls, an inlet for delivering granular material to said first crib, an outlet in said second crib, a first plow and mulling assembly rotatably mounted within said first crib and including a first plow movable through a portion of said second crib, a second plow and mulling assembly rotatably mounted within said second crib and including a second plow movable through a portion of the first crib, means for driving first and second assemblies in synchronism to transfer at least a portion of said material back and forth between the cribs, and means operable to control the relative quantities of material transferred between said cribs so that a large quantity of said material may be continuously moved from said first crib to said second crib and a smaller quantity of material may be returned from said second crib to said first crib for mixing with the granular material entering through said inlet.

4. In a mixer for granulated material the combination of a first crib, a second crib in communication with said first crib, first and second plows respectively located within said first and second cribs for movement therein, inlet means for admitting granular material to the first crib, outlet means in said second crib for discharging granular material, and means for rotating said plows, so that said first plow causes material to be transferred from said first crib to said second crib, said second plow being positioned relative to said first plow to pass immediately behind said first plow so that material adjacent to the second plow is prevented from flowing from the first crib to the second crib, whereby the material progresses continuously through the mixer through the inlet means, the first crib, the second crib and the outlet means.

5. In a mixer for granular material the combination of first and second cribs for said granular material, means placing said first and second cribs in communication, first and second plow means respectively supported within and movable relative to said first and second cribs, means for rotating each of the plow means in order to cause it to pass through a portion of the other crib to transfer granular material from the crib in which that plow means is supported to said other crib, thereby transferring said material back and forth between said cribs and mixing the granular material in the two cribs, and means to control the amount of granular material transferred between said cribs.

6. In a mixer for granular material the combination of first and second cribs for said granular material, means placing said first and second cribs in communication, first and second plow means respectively supported within and movable relative to said first and second cribs, means for rotating each of the plow means in order to cause it to pass through a portion of the other crib to transfer granular material from the crib in which that plow means is supported to said other crib, thereby mixing the granular material in the two cribs, and deflector means supported from at least one of said crib walls for adjusting the quantity of granular material passing between said cribs.

7. The mixer of claim 6 wherein said deflector means includes a plate pivotally mounted from at least one of said crib walls to be slightly spaced above said plow means.

References Cited in the file of this patent
UNITED STATES PATENTS

| | | |
|---|---|---|
| 1,331,969 | Tomlinson | Feb. 24, 1920 |
| 1,485,647 | Trust et al. | Mar. 4, 1924 |
| 1,723,620 | Hottman | Aug. 6, 1929 |
| 2,026,049 | Lasch et al. | Dec. 31, 1935 |
| 2,188,230 | Nicholson | Jan. 23, 1940 |
| 2,727,696 | Horth | Dec. 20, 1955 |

FOREIGN PATENTS

| | | |
|---|---|---|
| 3,973 | Great Britain | of 1882 |
| 377,010 | Great Britain | July 2, 1932 |
| 508,090 | France | July 15, 1920 |
| 434,943 | Germany | Oct. 4, 1926 |
| 435,220 | Italy | May 11, 1948 |
| 886,098 | Germany | Aug. 10, 1953 |